United States Patent [19]
Lin

[11] Patent Number: 5,209,957
[45] Date of Patent: May 11, 1993

[54] METHOD TO SEAL THE LEADING EDGE OF AN ENAMEL POT

[76] Inventor: Sheng-Chang Lin, No. 59, Ta-Jen Miao, Ta-Miao Village, Kuei-Jen Hsiang, Tainan Hsien, Taiwan

[21] Appl. No.: 750,248

[22] Filed: Aug. 27, 1991

[51] Int. Cl.⁵ ............................................. A47G 19/22
[52] U.S. Cl. .................................. 428/34.7; 427/284
[58] Field of Search ..................... 427/284; 428/34.7

[56] References Cited

U.S. PATENT DOCUMENTS 4,153,594  5/1979  Wilson ................................. 524/59
5,066,852  11/1991 Willbanks ........................... 219/544

Primary Examiner—Michael Lusigan
Attorney, Agent, or Firm—Bacon & Thomas

[57] ABSTRACT

A method to seal a leading edge of an enamel pot by applying a layer of thermoplastic silicone on the leading edge of the enamel pot and then capping the leading edge with a hoop is disclosed. The thermoplastic silicone isolates the leading edge from being directly exposed to air so as to minimize the possibility of being subject to oxidation.

2 Claims, 2 Drawing Sheets

METHOD TO SEAL THE LEADING EDGE OF AN ENAMEL POT

FIELD OF INVENTION

This invention relates to a method to seal the leading edge of an enamel pot. More particularly, a method of preventing the leading edge of an enamel pot from oxidizing under normal conditions.

BACKGROUND OF THE INVENTION

Enameling has being widely adpated to kitchenware for it possesses the characteristics of temperature endurability and corrosion resistance. In addition, enameling provides a high quality feeling and colorful appearance. However, during enameling processing, it is difficult to assure that the leading edge of the pot will be applied with enamel thoroughly due to its surface is too narrow, and the exposing area of the leading edge may produce oxidation reaction. To cover the exposing area, a stainless steel hoop is adapted to cap on the pot. Furthermore, the exposing area of the pot may have water left thereon after wash which expedites the the oxidation reaction.

It is therefore, a method of mounting a stainless steel hoop on a pot being invented to improve the above-mentioned defects.

SUMMARY OF THE INVENTION

Therefore, the objective of the present invention is to provide a method to put a stainless steel hoop on an ename pot to protect the leading edge of the pot from being direct exposed to air so as to minimize the possibility of expediting oxidation reaction.

It is another object of the present invention to provide a method of protecting the leading edge of an enamel pot from being corroded under normal condition.

Other objects, together with the forgoing, are attained in the embodiment of the invention described in the accompanying description and illustrated in the accompanying drawings.

DETAILED DESCRIPTION OF THE PREFERRED EMBODIMENT

Figure 1B:
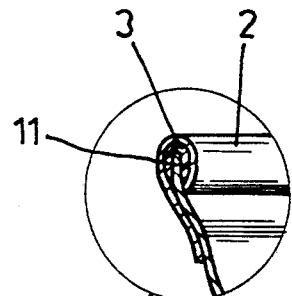
FIG. 1B is a partial enlarged sectional view of FIG. 1A.
Figure 1C:
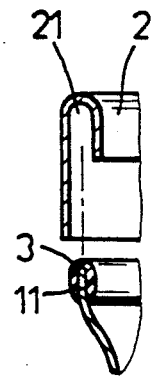
FIG. 1C is an exploded view of FIG. 1B.
Figure 1A:
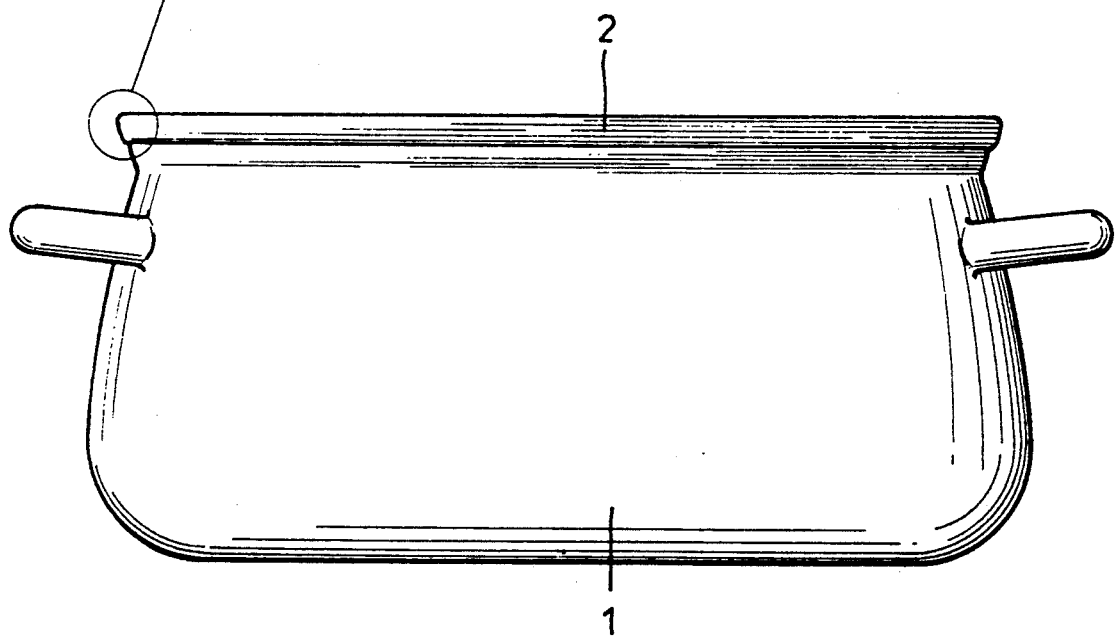
FIG. 1A, is a plan view of an enamel pot of the present invention.

Referring to the drawings wherein the showings are for the purpose of illustrating a preferred embodiment of the invention only and not for the purpose of limiting the same, FIGS. 1A, 1B, and 1C show the leading edge 11 of an enamel pot 1 being applied with special material 3, preferably thermoplastic silicone, to an amount that when a stainless steel hoop 2 is capped on the leading edge 11, the thermoplastic silicone 4 can fill up the groove 21 of the hoop 2 and securely connect the hoop 2 to the leading edge 11. Thus, the leading edge 11 is sealed by the thermoplastic silicone 3 and the posibility of oxidation reaction of the exposing area is lowered to the least.

Figure 2B:
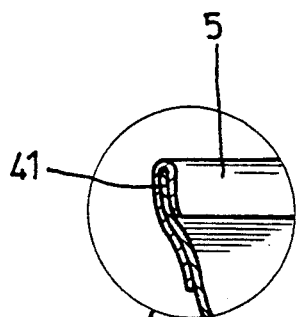
FIG. 2B is a partial enlarged sectional view of FIG. 2A.
Figure 2A:
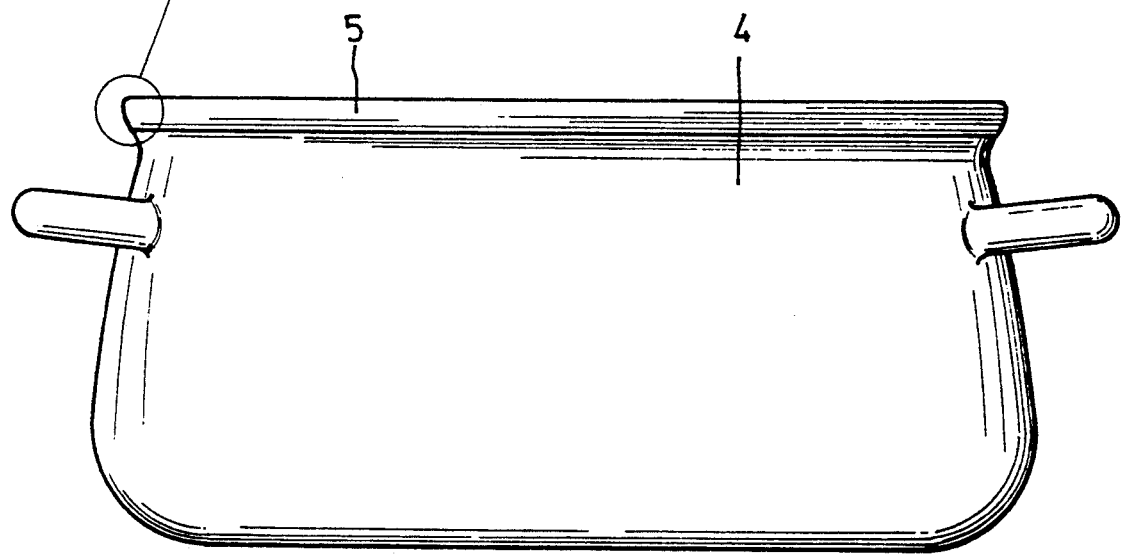
FIG. 2A is a plan view of prior art.

Whereas, prior art, as shown in FIGS. 2A and 2B, also has a stainless steel hoop 5 caps on the leading edge 41 but without filling in any material to the spacing area between the leading edge 41 and the hoop 5. Therefore, the exposing area of the leading edge 31 may easily be corroded.

I claim:

1. A method for sealing an upper leading edge of an enamel pot comprising capping the upper leading edge with a stainless steel hoop with a thermoplastic silicon material between the stainless steel hoop and the upper leading edge.

2. A sealing arrangement for an upper leading edge of an enamel pot comprising a stainless steel hoop and a thermoplastic silicone sealing material, said stainless steel hoop being adapted to cap the upper leading edge of the enamel pot with said thermoplastic silicone sealing material therebetween such that the possibility of the leading edge being subjected to oxidation is minimized.

* * * * *